United States Patent
Thyssen (10) Patent No.: US 6,199,671 B1
(45) Date of Patent: Mar. 13, 2001

(54) SHOCK ABSORBER

(75) Inventor: Cornelius Johannes Thyssen, Van Riebeeckpark (ZA)

(73) Assignee: New Joules Engineering (Sales) Proprietary) Limited, Edenvale (ZA)

(*) Notice: Subject to any disclaimer, the term of this patent is extended or adjusted under 35 U.S.C. 154(b) by 0 days.

(21) Appl. No.: 09/186,893

(22) Filed: Nov. 6, 1998

(30) Foreign Application Priority Data

Sep. 14, 1998 (ZA) ..................................................... 98/8385
Oct. 7, 1998 (ZA) ..................................................... 98/9142

(51) Int. Cl.⁷ ..................................................... F16F 9/34
(52) U.S. Cl. ..................... 188/282.1; 188/322.13; 188/322.15; 188/282.8; 267/256; 104/26.2
(58) Field of Search .................................. 104/26.1, 26.2, 104/126.2; 188/322.13, 322.15, 322.16, 322.17, 282.1, 282.8, 269; 267/267, 217, 256, 64.15

(56) References Cited

U.S. PATENT DOCUMENTS

| | | |
|---|---|---|
| 483,529 | 10/1892 | Bryon, Jr. . |
| 1,401,111 | 12/1921 | Sigel . |
| 1,427,764 | 8/1922 | Stuebing et al. . |
| 1,471,560 | 10/1923 | Langford . |
| 1,543,098 | 6/1925 | Carter et al. . |
| 1,563,169 | 11/1925 | Daniel et al. . |
| 2,472,841 | 6/1949 | Ochs . |
| 3,113,644 | 12/1963 | Wossner . |
| 3,513,947 | 5/1970 | Duckett . |
| 3,756,357 | 9/1973 | Graff et al. . |
| 4,307,875 | 12/1981 | Schnitzius et al. . |
| 4,474,271 | 10/1984 | Mölders et al. . |
| 4,721,189 | 1/1988 | Bick . |
| 4,821,852 | * 4/1989 | Yokoya ............................ 188/322.15 |
| 5,441,133 | 8/1995 | Murakami . |
| 5,462,141 | * 10/1995 | Taylor .............................. 188/322.13 |
| 5,595,269 | 1/1997 | Beck . |
| 5,727,663 | * 3/1998 | Taylor .................................. 188/269 |
| 5,730,260 | 3/1998 | Thyssen . |

FOREIGN PATENT DOCUMENTS 0 752 357 A2    1/1987   (EP) .

* cited by examiner

*Primary Examiner*—Robert J. Oberleitner
*Assistant Examiner*—Devon Kramer
(74) *Attorney, Agent, or Firm*—Jacobson, Price, Holman & Stern, PLLC (57) ABSTRACT

A piston-type rail retarder includes a shock absorber having a cylinder defining a cavity between a pair of end walls. A piston rod extends axially through one of the end walls, and a piston is mounted on the piston rod between the end walls so as to divide the cavity into first and second working chambers containing a damping fluid. A first array of passages extends through the piston and communicates between the first and second chambers, and a sprung valve assembly is provided for obturating the first array of passages in the event of the velocity of the piston rod relative to the cylinder exceeding a predetermined value. The first valve mechanism includes a valve plate and a spring for biasing the valve plate into an open position. An array of restricted orifices extend through the valve plate and communicate directly with the corresponding array of first passages when the valve plate is closed. The restricted orifices limit the flow of fluid through the first array of passages so as to set up a pressure differential between the first and second working chambers and to apply a predetermined damping force. The dimensions of the restricted orifices are determined in accordance with the desired force-displacement profile of the shock absorber.

11 Claims, 13 Drawing Sheets

SHOCK ABSORBER

BACKGROUND OF THE INVENTION

THIS invention relates to a shock absorber, and in particular to a shock absorber for use as a wagon retarder of the type in which movement of a wagon wheel along the rail is regarded by the retarder acting against a peripheral flange of the wheel.

In the applicant's corresponding U.S. Pat. No. 5,730,260, which is incorporated herein by reference in its entirety, a rail retarder-type shock absorber is disclosed which includes a cylinder defining a cavity between a pair of end walls. A piston rod extends axially through one of the end walls, and a piston is mounted on the piston rod between the end walls so as to divide the cavity into first and second working chambers containing a damping fluid. A first array of passages extends through the piston and communicates between the first and second chambers, and a sprung valve assembly is provided for obturating the first array of passages in the event of the velocity of the piston rod relative to the cylinder exceeding a predetermined value. A second array of passages communicates between the working chambers and provides a fluid flow path when the first array of passages is blocked by the sprung valve assembly. Restricted exhaust orifices communicate with the second array of passages for limiting the flow of fluid through the second array of passages so as to control the movement of the piston rod. The dimensions of the exhaust orifices are determined in accordance with the desired force-displacement profile of the shock absorber.

In a preferred embodiment, a so-called "relaxable orifice" version of the shock absorber is provided in the form of a moveable orifice plate which is spring biased against the rearmost face of the piston to define the restricted exhaust orifices and to allow them to open in response to an increase in pressure.

Whilst this shock absorber has been found to operate effectively, a number of manufacturing steps are associated with the formation of the first and second arrays of passages, as well as the formation and adjustment of the restricted exhaust orifices.

In addition, in the "relaxable orifice" version, it has been proved difficult to release sufficient fluid as the orifice plate opens to ensure that the counter-force exerted by the retarder is insufficient to cause bounce and possible derailment in the case of lighter rolling stock moving at relatively high speeds.

SUMMARY OF THE INVENTION

According to a first aspect of the invention there is provided a shock absorber comprising:

a) a cylinder defining a cavity between first and second end walls;

b) a piston rod extending axially through one of the end walls;

c) a piston assembly carried on the piston rod and mounted to slide axially within the cylinder so as, to divide the cavity into first and second working chambers arranged to contain damping fluid;

d) first passage means extending through the piston assembly and communicating between the first and second working chambers;

e) first valve means for at least partly closing the first passage means in the event of the axial velocity of the piston relative to the cylinder in a first axial direction exceeding a predetermined value, and f) at least one permanently open restricted orifice being defined in the first valve means and communicating between the first and second working chambers via the first passage means on closure of the first valve means, the restricted orifice being restricted relative to the first passage means so as to limit the flow of damping fluid between the first and second working chambers and to set up a pressure differential therebetween to apply a predetermined damping force, with the dimensions of the restricted orifice being determined in accordance with the desired force-displacement profile of the shock absorber.

Preferably, the valve means includes a valve plate and biasing means for biasing the valve plate into an open position, with the restricted orifice means extending through the valve plate and communicating directly with the first passage means when the valve plate is closed.

Preferably, the first valve means is located operatively upstream of the first passage means within the first working chamber.

The restricted orifice means typically has a diameter of 0–3 mm, and preferably of around 2 mm.

In one form of the invention, the shock absorber includes second passage means communicating between the first and second working chambers, second valve means for at least partly obturating the second passage means, and second biasing means for biasing the second valve means into a closed position, the second valve means being arranged to open in response to a predetermined pressure differential existing between the first and second working chambers.

Typically, the second valve means includes a second valve plate defining a pressure accumulator well portion which is responsive to pressure exerted by fluid via the second passage means, the second valve plate being arranged to open in response to a predetermined pressure differential existing between the first and second working chambers.

Advantageously, the first passage means comprises a plurality of equi-spaced cylindrical first passages extending axially through the piston assembly, the at least one permanently open restricted orifice comprises a plurality of corresponding equi-spaced cylindrical restricted orifices extending axially through the first valve means, and alignment means are provided for aligning the first passages with the restricted orifices.

According to a further aspect of the invention there is provided a shock absorber comprising:

a) a cylinder defining a cavity between first and second end walls;

b) a piston rod extending axially through one of the end walls;

c) a piston assembly carried on the piston rod and mounted to slide axially within the cylinder so as to divide the cavity into first and second working chambers arranged to contain damping fluid;

d) first passage means extending through the piston assembly and communicating between the first and second working chambers;

e) second passage means extending through the piston assembly and communicating in use between the first and second working chambers;

f) first valve means for at least partly closing the first passage means in the event of the axial velocity of the piston relative to the cylinder in a first axial direction exceeding a predetermined value; and g) second valve means for at least partly obturating the second passage means, the second valve means including a valve plate defining a pressure accumulator well which is responsive to pressure exerted by fluid via the second passage means, and biasing means for biasing the valve plate into a closed position, the second valve means being arranged to open in response to a predetermined pressure differential existing between the first and second working chambers.

Advantageously, at least one restricted orifice is defined in the first valve means and communicates between the first and second working chambers via the first passage means on closure of the first valve means, the restricted orifice being restricted relative to the first passage means so as to limit the flow of damping fluid between the first and second working chambers and set up a pressure differential therebetween to apply a damping force.

The second valve means may be in the form of a true valve, in that it is capable of completely obturating the second passage means.

Alternatively, the second valve means may alternatively be in the form of an orifice plate which only partly obturates the second passage means so as to define a permanently open restricted exhaust orifice.

Typically, the pressure accumulator well includes an annular stepped recess, and the piston assembly includes an operatively rearmost face having a complementally stepped projection which locates within the recess in a sliding fit.

The invention extends to a rail retarder including a shock absorber of the type described, as well as to a piston assembly comprising integers a) to f) above.

DESCRIPTION OF EMBODIMENTS

Figure 1:
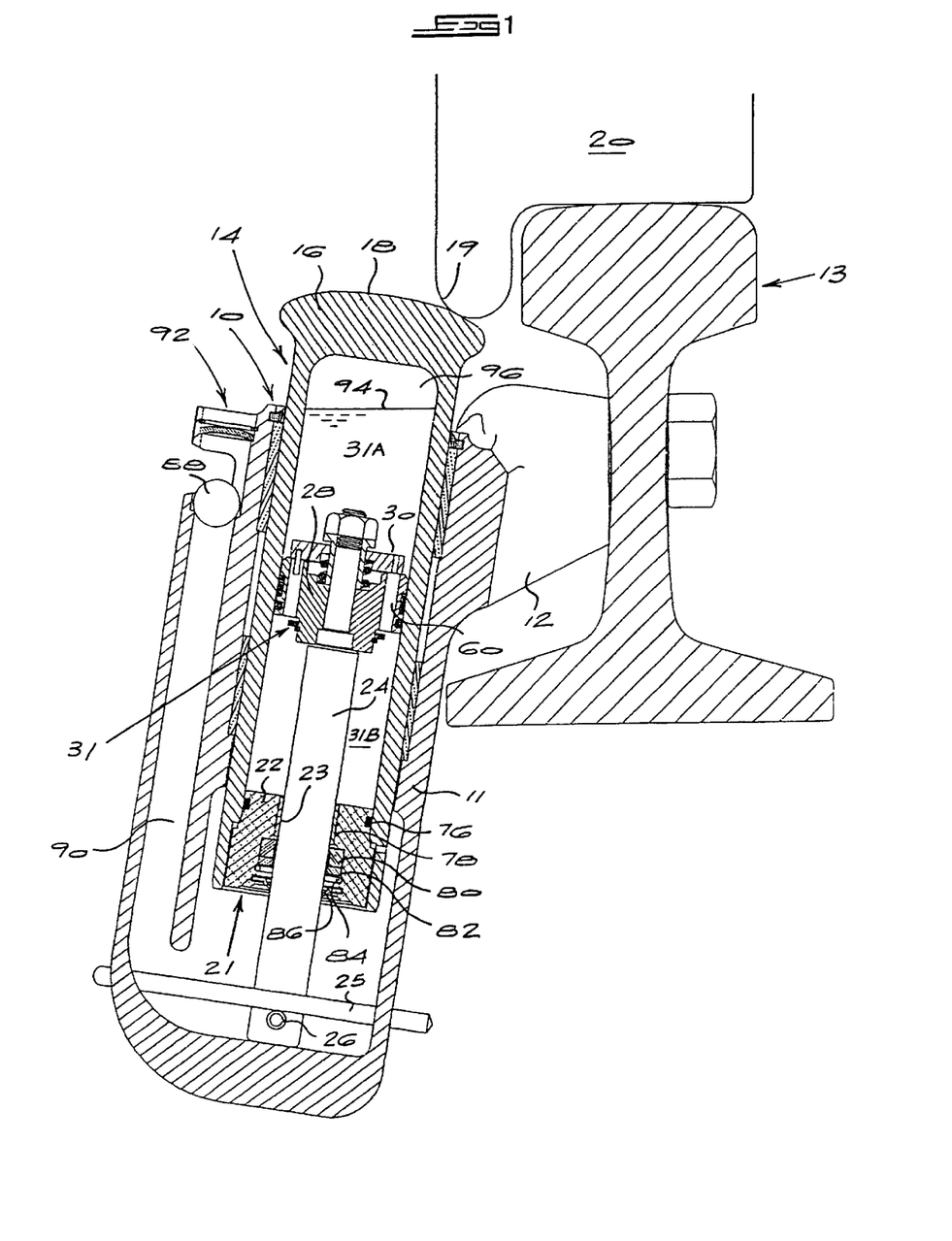
FIG. 1 shows a partly cross-sectional side view of a rail retarder of the invention fitted to a rail.

Referring first to FIG. 1, a wagon retarder 10 includes a pot housing 11 which is bolted via an integral flange 12 to a rail 13 in a marshalling yard. A cylinder 14 is mounted slidably within the pot housing 11, and is formed with an upper closed end 16 having a mushroom head-shaped upper percussion surface 18 against which the outer flange 19 of a wagon wheel 20 abuts.

An opposite open end 21 of the cylinder is fitted with a gland nut 22 having a central aperture 23 through which a piston rod 24 extends. The lower end of the piston rod 24 is mounted fast against the base of the pot housing 11 by means of a retaining clip 25. The retaining clip 25 holds the piston rod 24 in position via a cross bar 26 which extends through the lower end of the piston rod.

A piston head 28 and a valve disc or plate 30 is bolted to the opposite end of the piston rod so as to form a piston assembly 31 dividing the cylinder cavity into upper and lower working chambers 31A and 31B.

Figure 2:
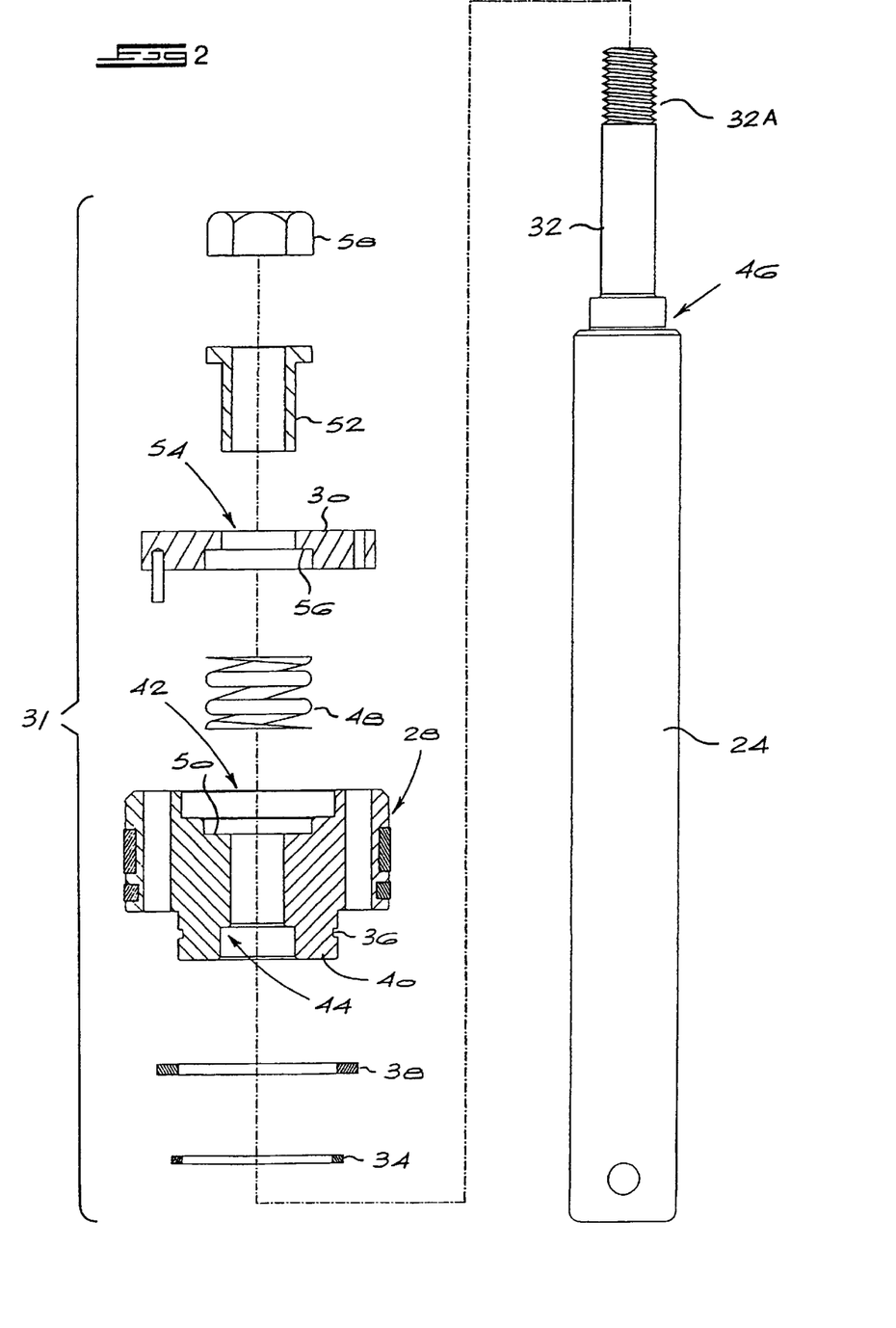
FIG. 2 shows an exploded partly cross-sectional side view of a first embodiment of a piston assembly of the invention.

FIG. 2 shows clearly how the various components making up the piston assembly 31 are stacked onto a narrowed integral stem portion 32 at the upper end of the piston rod 24. A circlip 34 locates within a lower circumferential indent 36 so as to hold a ring-shaped clack plate 38 in position on a lower projecting platform 40 of the piston 28. The piston 28 is formed with a central stepped aperture 42 having a lower stepped portion 44 which is arranged to locate snugly over the complimentally stepped or shouldered portion 46 at the base of the piston rod stem 32. A coil spring 48 locates on a spring seat 50 defined within the aperture 42, and a tubular spacing bush 52 extends through the coil spring 48 and also locates against the spring seat 50. The valve disc or plate 30 is formed with a central aperture 54 through which the bush 52 passes. An upper spring seat 56 locates the upper end of the coil spring 48, and a clamping nut 58 holds the entire piston assembly 31 in position by being screwed down over a threaded portion 32A of the stem 32. It can clearly be seen from the detail of FIGS. 3A and 3B how the piston assembly is bolted in position onto the piston rod 24. Referring also to FIGS. 4A to 4C, the piston head 28 is formed with a first array of passages in the form of three equi-spaced outer arcuate passageways 60 around which raised platform portions 62 extend, each being formed with uppermost planar sealing faces 64. The valve disc 30 is formed with a second array of passages in the form of three equi-spaced round cylindrical passageways 66 which extend completely through the valve disc. In this particular example, the passageways 66 have a diameter of 2 mm, in contrast to the passages 60, which are at least 5 mm wide and 22 mm long. A locating or registering pin 68 extends from a lower planar sealing face 70 of the valve disc, and is arranged to locate within one of the passages 60.

The piston head 28 is fitted with piston rings in the form of upper and lower brass rings 72A and 72B and a lower PTFE ring 74 so as to provide an effective seal between the two working chambers 31A and 31B. As is clear from FIG. 1, the gland nut 22 is fitted with an annular rubber sealing ring 76 providing a tight seal between the outer surface of the nut and the walls of the cylinder 14. A glacier bush 78, a dynamic oil seal 80 and a back-up washer 82 provide an effective dynamic seal between the piston rod 24 and the gland nut 22. The dynamic oil seal 80 and washer 82 are held in position by means of a sprung clip 84, with an outer rubber sealing flange 86 completing the dynamic sealing arrangement. A ball valve 88 is provided at the head of a breather passage 90 defined in the pot for limiting the ingress and allowing the escape of rain water and the like from the pot. The condition of the ball valve can be viewed via an inspection port 92.

Both working chambers 31A and 31B are charged with hydraulic oil up to a level 94, with a pocket of nitrogen gas 96 being located above the oil level and being arranged to compress in response to the initial application of force via the wagon wheel 20. The nitrogen pocket also acts as a pneumatic spring to return the sliding cylinder 14 to its original extended position after it has undergone a downward compression stroke.

In response to the application of force via the flange 19 of the wagon wheel against the percussion surface 18, the cylinder 14 commences a downward stroke. The nitrogen gas is compressed during a first part of the stroke. Thereafter, oil starts flowing from the upper chamber 31A to the lower chamber 31B via the passageways 60 in the direction of arrows 98. The velocity of the oil travelling through the passageways 60, and in particular at zones 100 just beneath the valve disc 30 will increase as the cylinder accelerates downwards. The increase in velocity of the fluid at the zone 100 will create a reduced pressure zone which will tend to cause the valve disc 30 to close against the biasing force of the spring 48 to the FIG. 3B position after a predetermined velocity has been reached. In this position, the lower sealing face 70 of the valve disc abuts sealingly against the upper sealing face 64 of the platform portions 62. As a result, the only possible fluid flow paths that now exist between the first and second chambers 31A and 31B are via the restricted passageways 66 and the arcuate passageways 60, as is shown by arrow 101. The restricted passageways 66 will create a pressure drop in respect of the fluid flowing through these passageways, resulting in an increase pressure differential existing between the first and second chambers, thereby creating a counter-force which effectively retards the downward movement of the piston head and "extracts" the kinetic energy of the, wagon via the wagon wheel 20, so as to slow it down to a predetermined speed.

Once the wagon wheel has passed over the retarder, a forward stroke is initiated by the expansion of the pocket of nitrogen gas 96. During the return stroke, the spring 48 naturally biases the valve plate into its open FIG. 3A position. In addition, the clack plate 38 is drawn upwardly by the return flow to partly block off the passageways 60, thereby slowing and controlling the return stroke of the cylinder so as to prevent overshoot.

Figure 5A:
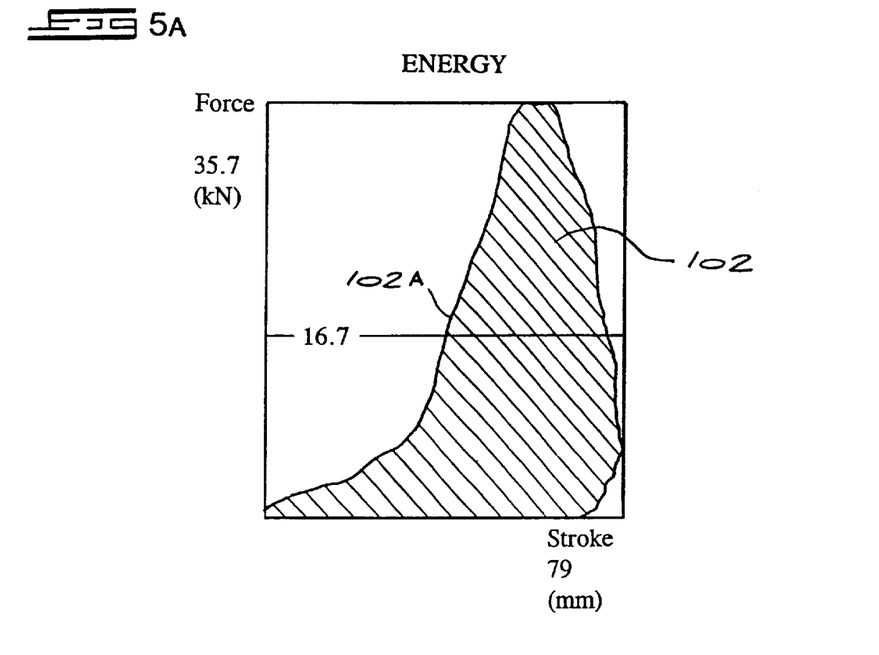
FIG. 5A shows a force-stroke graph illustrating the performance of the rail retarder of FIG. 1.

Referring now to FIG. 5A, a typical force-stroke graph is shown for a wagon retarder of the type described in which each restricted passageway has a diameter of 2 mm. In a particular test that was run, the nitrogen gas pressure was set to 700 kPa, and there was an ambient temperature of 20° C., with an oil mass of 178 g. The incoming speed of the wagon was 2.604 ms$^{-1}$, and the outgoing speed was 2.488 ms$^{-1}$, with the load on each wheel being approximately 45 kN. The resultant energy extracted by the retarder, which is represented by the hatched area 102 under the curve 102A, was found to be 1242 J. The average retarding force was 15.7 kN, with the maximum force being 35.7 kN. The duration of the power or retarding stroke was found to be 123 ms, and the duration of the return stroke was 149 ms, with the cylinder reaching a maximum downward velocity of 1.285 ms$^{-1}$.

In FIGS. 6 to 8C, a second embodiment of a rail retarder of the invention 106 is shown in which identical components are indicated with identical numerals. As can more clearly be seen in FIGS. 7A and 7B, a third array of round cylindrical passages 108 having a diameter of 5 mm extend entirely through the piston 110. A secondary valve assembly 112 comprising a valve disc 113 and a stack of six plate washers 114 making up a plate washer pack 116 is positioned slidably on a base portion 118 of the stem 120A of the piston rod 24. The valve plate 113 is biased by the pack of plate springs 116 to close off the downstream openings of the passageways 108.

Figure 3A:
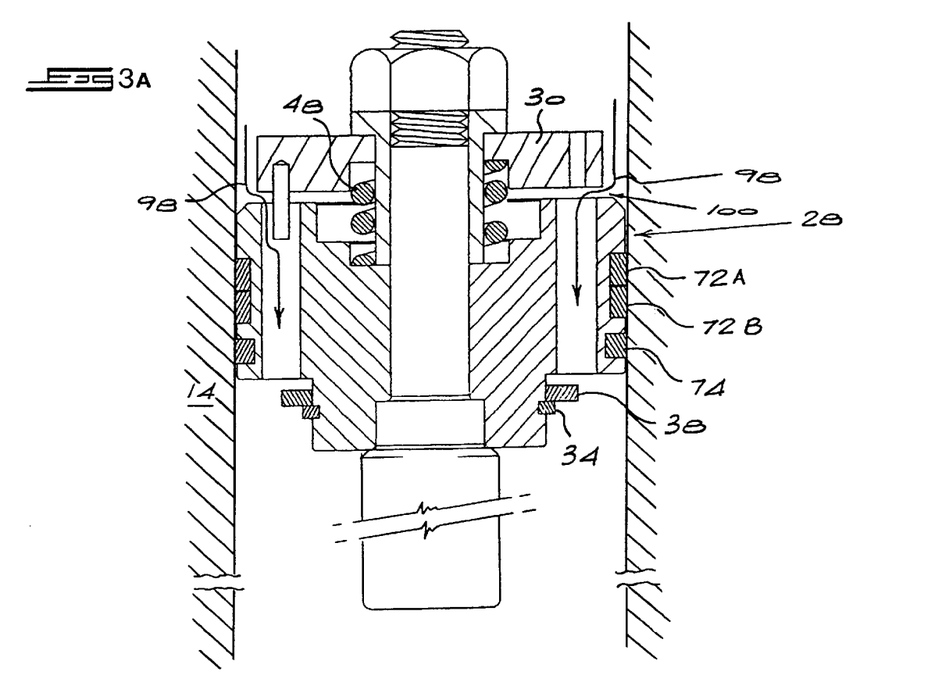
FIGS. 3A & 3B show assembled partly cross-sectional side views of the piston assembly of FIG. 2 in the respective open and closed positions.
Figure 3B:
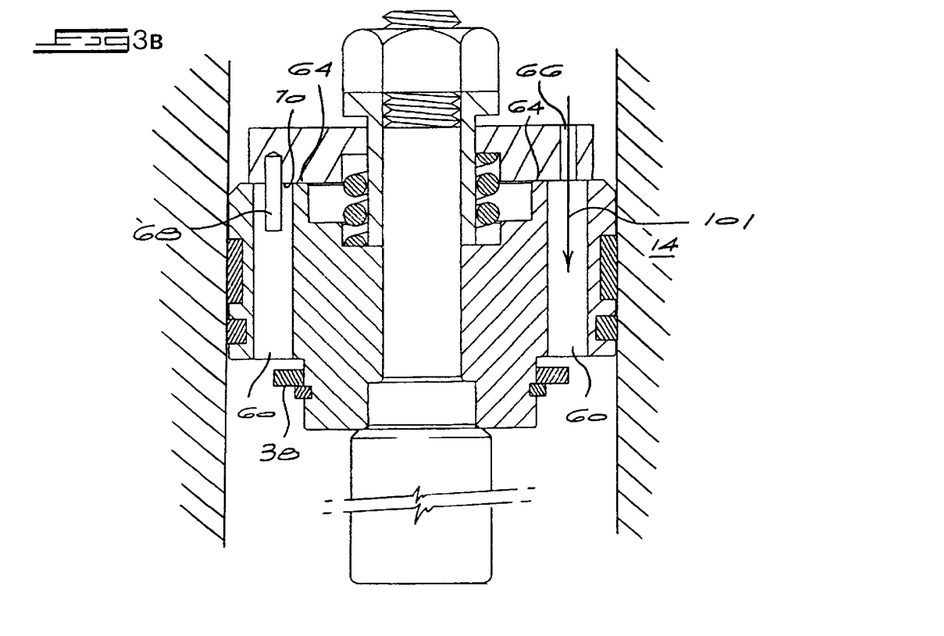
Figure 4A:
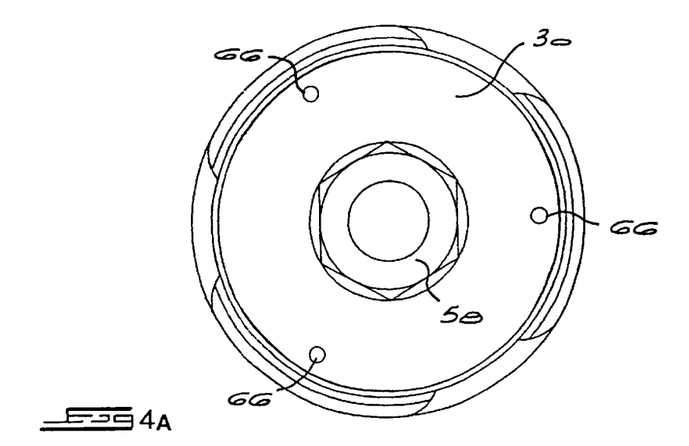
FIG. 4A shows a top plan view of the piston assembly of FIGS. 3A and 3B.
Figure 4B:
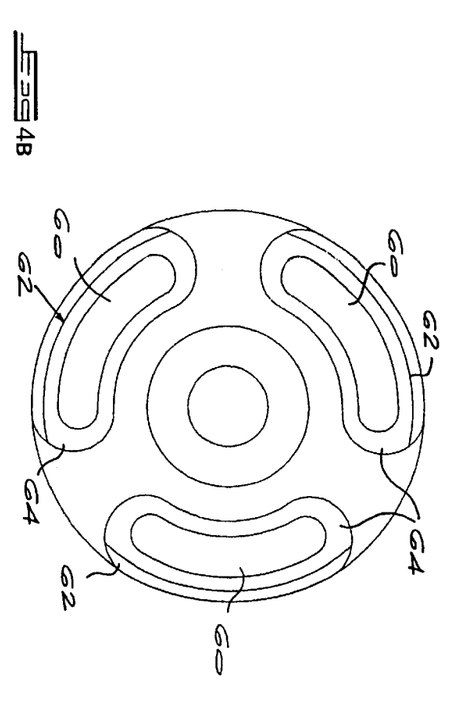
FIG. 4B shows a top plan view of a piston head forming part of the piston assembly of FIGS. 3A and 3B.
Figure 4C:
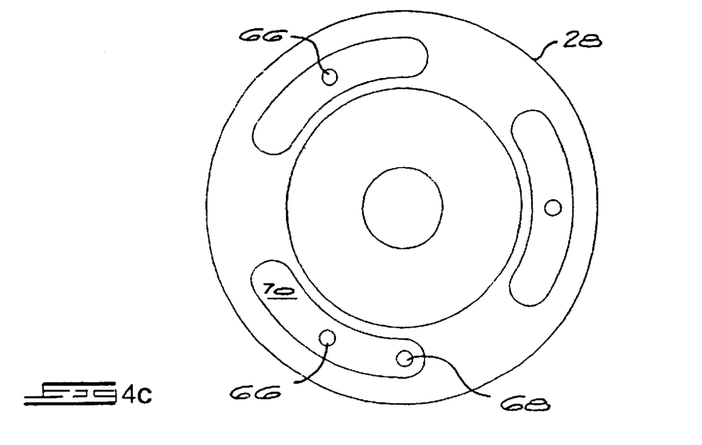
FIG. 4C shows an underplan view of the piston head of FIG. 4B.
Figure 8A:
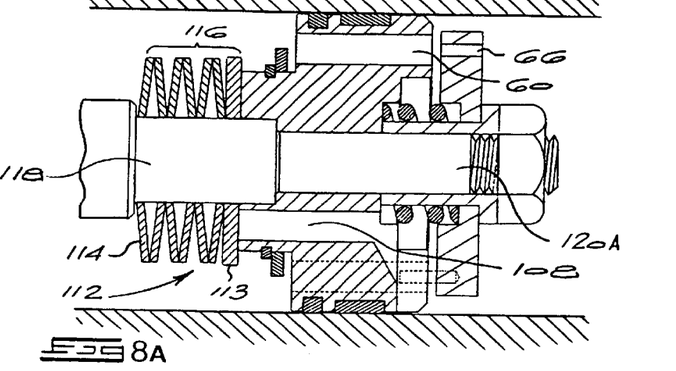
FIGS. 8A to 8C show partly cross-sectional side views of a piston assembly of FIG. 6 in three different modes of operation.
Figure 8B:
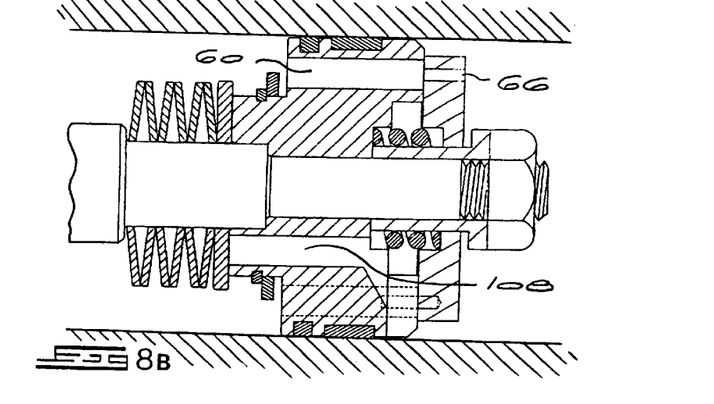
Figure 8C:
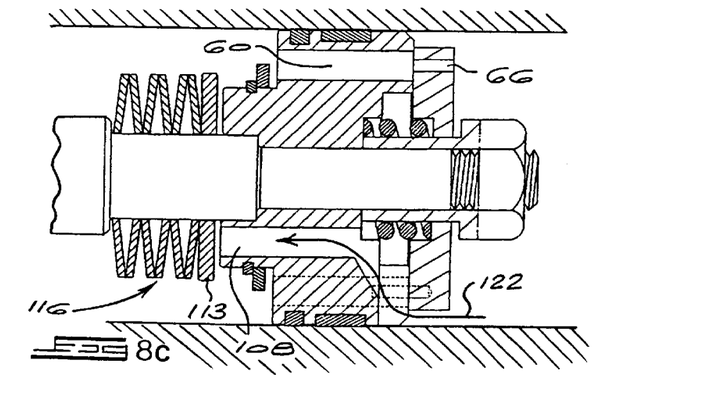

In FIG. 8A, the piston assembly is shown in a first idle mode of operation which is effectively identical to that of FIG. 3A. In FIG. 8B, a second mode of operation essentially identical to that of FIG. 3B is illustrated, in which the restricted passageways 66 communicate directly with the passageways 60. In FIG. 8C, a third mode of operation is indicated in which the increase in pressure through the third array of passages 108 causes the secondary valve plate 113 to open against the bias of the pack plate springs 116. Opening of the valve plate or disc 114 will typically occur when the downward force applied to the shock absorber exceeds around 20 kN so as to allow damping fluid to be dumped more rapidly into the working chamber 31B in the direction of arrow 122. Naturally the force and rate at which the valve plate 114 opens can be adjusted from less than 20 kN to 35 kN or more by varying the number as well as the resilient properties of the plate springs and the pack of plate springs.

Figure 5B:
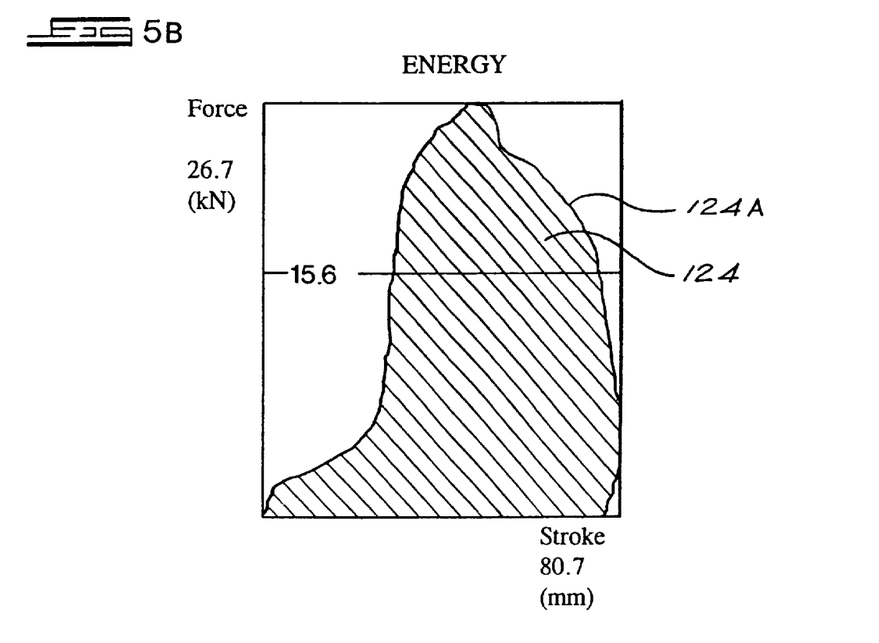
FIG. 5B shows a force-stroke graph illustrating the performance of the rail retarder of FIG. 6.
Figure 6:
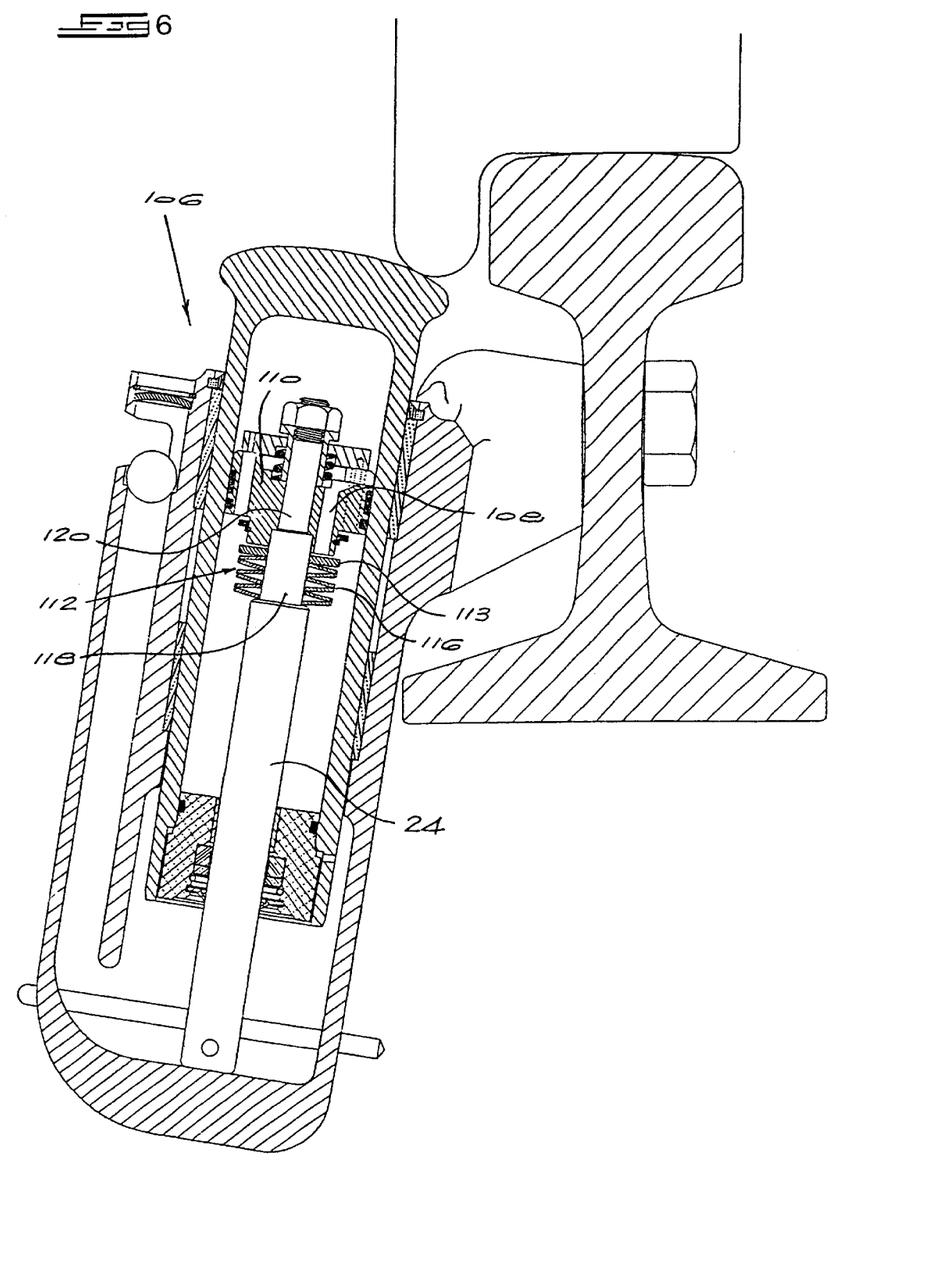
FIG. 6 shows a partly cross-sectional side view of a second embodiment of a rail retarder of the invention.
Figure 7A:
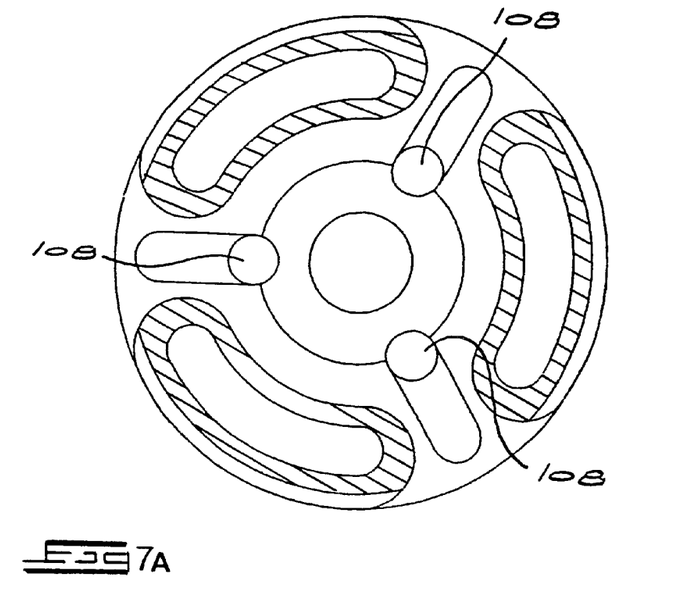
FIG. 7A shows a top plan view of a piston head forming part of the rail retarder of FIG. 6.
Figure 7B:
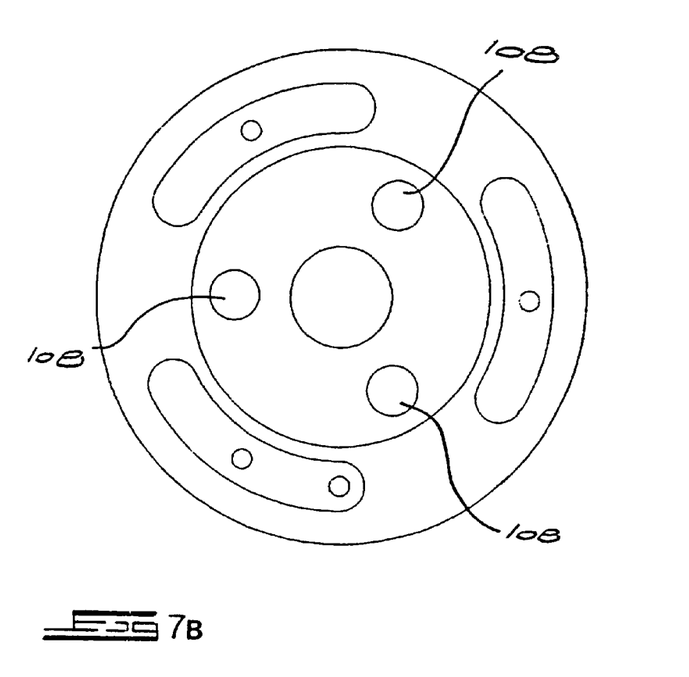
FIG. 7B shows an underplan view of the piston head of the rail retarder of FIG. 6.

In FIG. 5B, a typical force-stroke graph is shown for a wagon retarder of FIG. 6. The test conditions were substantially identical to those which gave rise to the FIG. 5A graph. The outgoing speed of the wagon was 2.564 ms$^{-1}$, with the resultant energy extracted by the retarder being represented by the hatched area 124 beneath the curve 124A being 1257 J. The average retarding force exerted by the retarder was found to be 15.57 kN, with the maximum force being 36.7 kN. The duration of the power or retarding stroke was found to be 124 ms, and the duration of the return stroke was 258 ms, with the cylinder reaching a maximum downward velocity of 1.308 ms$^{-1}$. The efficiency of the retarder of FIG. 6 was found to be 58.7%, in contrast to the 44.1% efficiency figure of the retarder of FIG. 5A. It can clearly be seen from the graphs that, whilst the maximum retarding force of the retarder of FIG. 6 was considerably less at 26.7 kN, the total energy extracted by this retarder was marginally greater than the energy extracted by the retarder of FIG. 5A. This was as a result of the curve being "fatter", in that the energy extraction was spread more evenly over the entire downward stroke of the retarder. One favourable consequence of this is that wheel-lift is reduced, in that the maximum counter-force exerted by the retarder is lower, and does not rise to as sharp a peak as is the case in FIG. 5A. The second embodiment of the retarder is particularly well suited to the high speed pull-out of wagons at the lower end of the yard where a gentler retarding force is required, especially in respect of lighter wagons, so as to ensure that derailment arising from wheel-lift does not occur.

Figure 9:
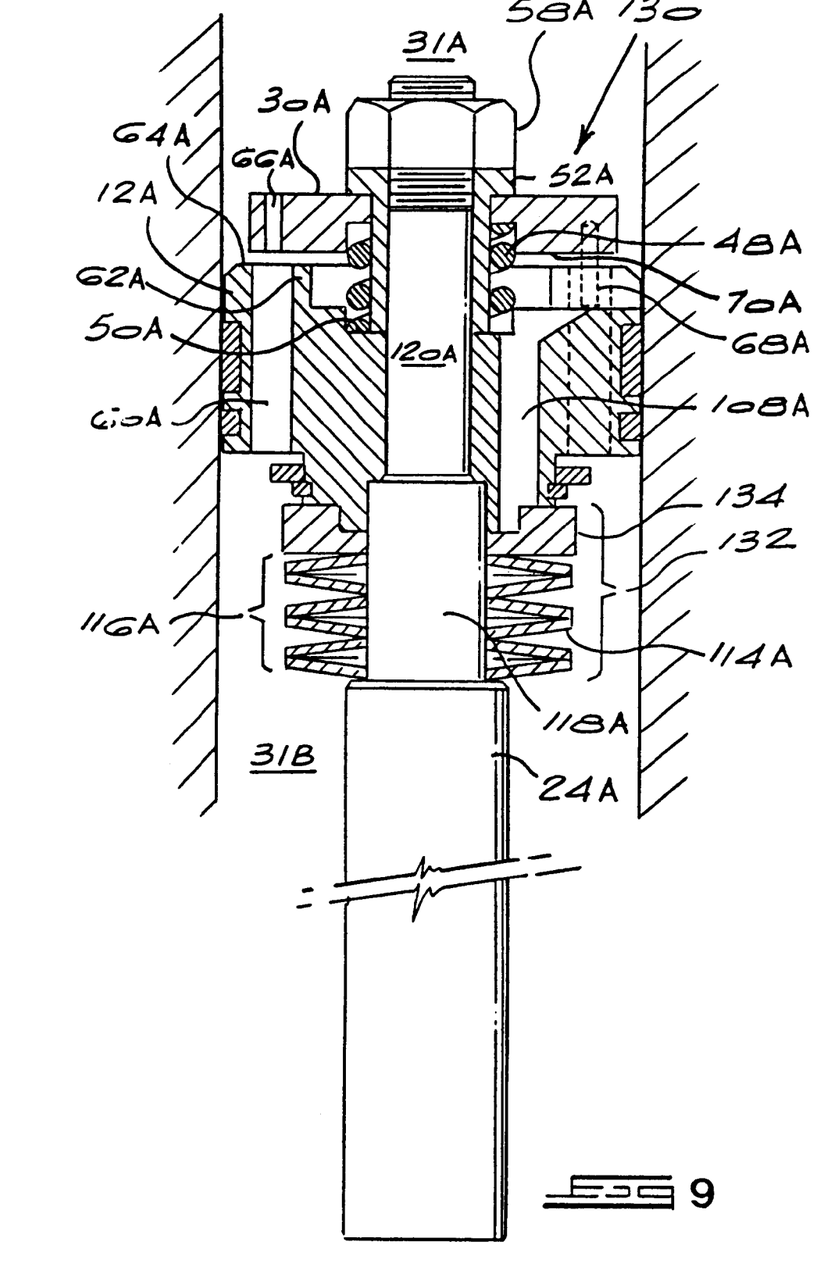
FIG. 9 shows an assembled partly cross-sectional side view of a piston assembly forming part of a third embodiment of a rail retarder of the invention in a first idle mode of operation.

In FIG. 9, those components of the piston assembly which are substantially identical to the piston assembly of FIG. 6 are identified with the same numerals suffixed by an "A". A piston assembly 130 includes a secondary valve assembly 132 comprising a valve disc 134 and a stack of six plate washers 114A making up a plate washer pack 116A which is positioned slidably on a base portion 118A of a stem 120A of piston rod 24A. The valve plate 134 is biased by the pack of plate springs 116A to close off downstream openings of three equi-spaced passageways, one of which is indicated at 108A. The passageways 108A extend through a piston body 110A which fits over the stem 120A of the piston rod 24A, and is held in position by means of a clamping nut 58A via a tubular spacer bush 52A. A coil spring 48A locates on a spring seat 50A, and biases the valve disc or plate 30A into an open position. The piston assembly divides the cylinder cavity into upper and lower working chambers 31A and 31B.

The piston head 110A is formed with three equi-spaced outer arcuate passageways 60A around which a raised platform portions 62A extend, each being formed with uppermost planar sealing faces 64A. The valve disc 30A is formed with a second array of passages in the form of three equi-spaced round cylindrical passageways 66A which extend completely through the valve disc. A locating and registering pin 68A extends from a lower planar sealing face 70A of the valve disc, and is arranged to locate within one of the passages 60A.

Figure 10:
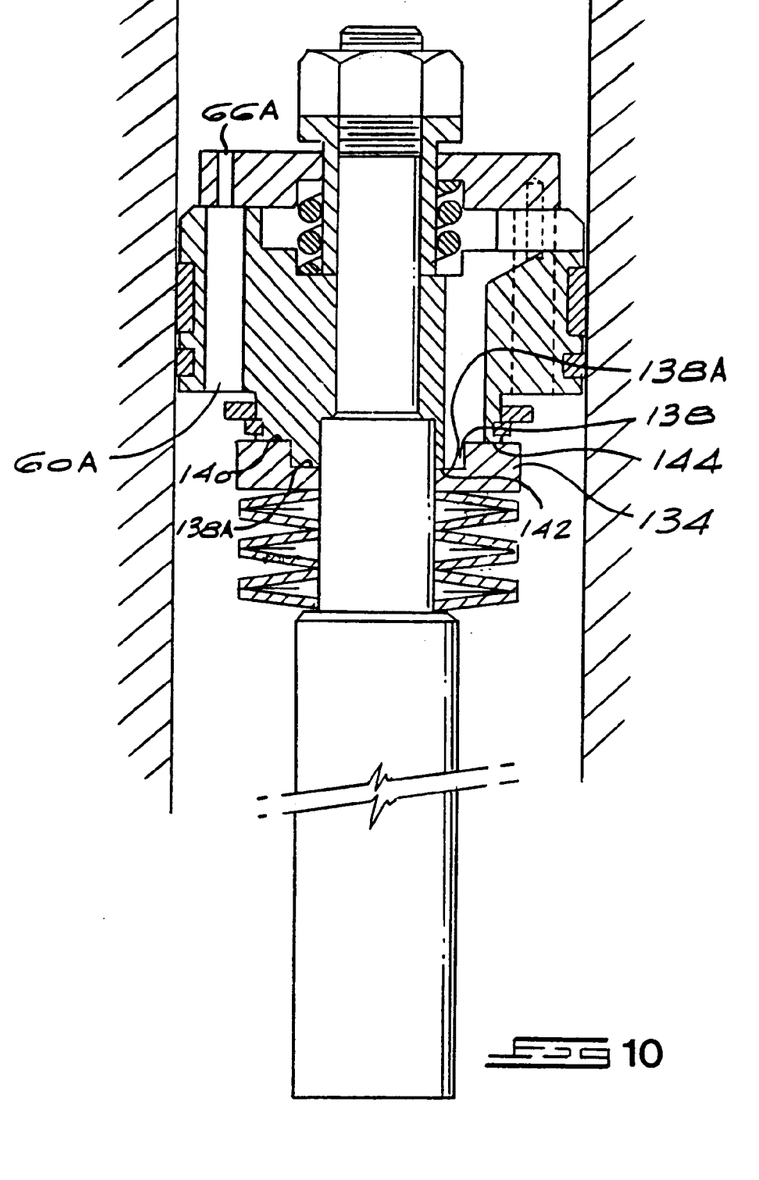
FIG. 10 shows the piston assembly of FIG. 9 in a second intermediate closed mode of operation.
Figure 11:
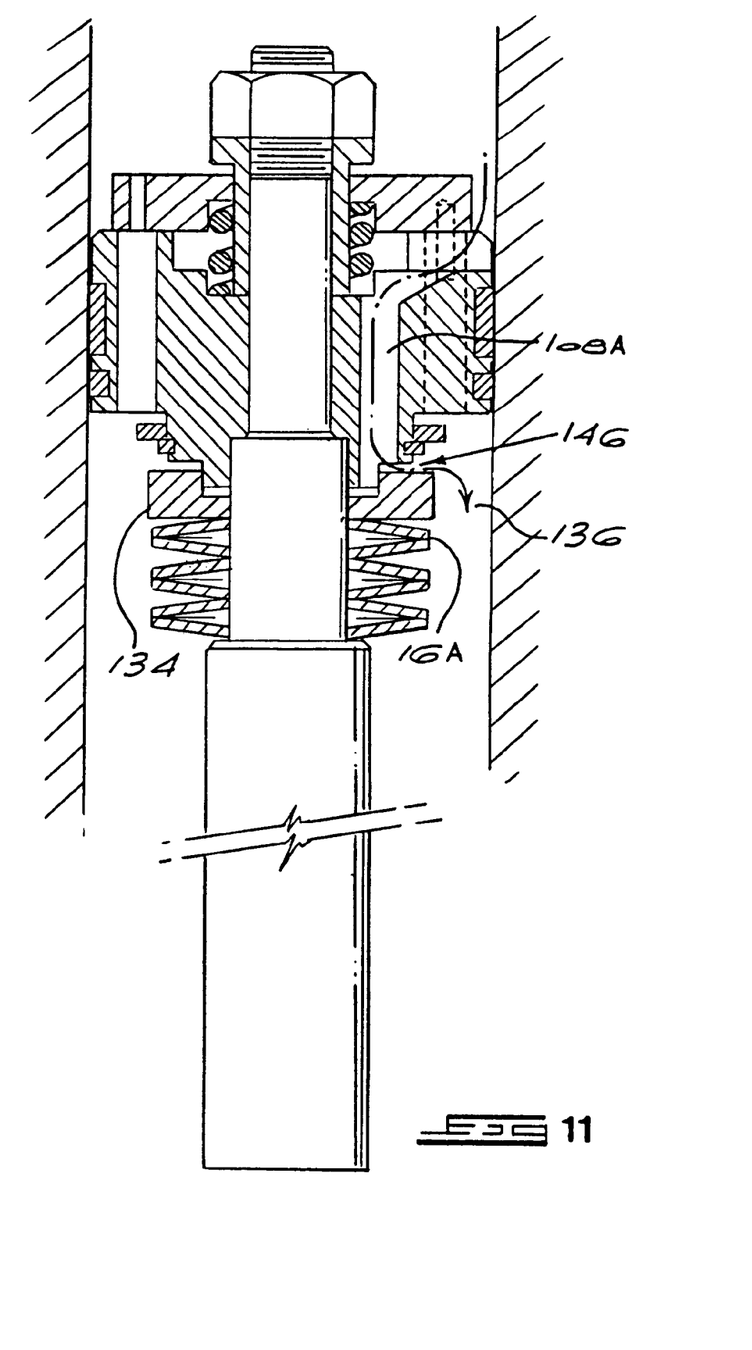
FIG. 11 show the piston assembly of FIG. 9 in a third open mode of operation.

In the first idle mode of operation the piston assembly operates in a manner which is essentially identical to that of FIGS. 3A and 8A. In FIG. 10, a second intermediate closed mode of operation essentially identical to that of FIGS. 3B and 8B is illustrated, in which the restricted passageways 66A communicate directly with the passageways 60A. In FIG. 11, a third open mode of operation is indicated in which the increase in pressure through the third array of passageways 108A causes the secondary valve plate 134 to be opened against the bias of the pack of plate springs 116A. Opening of the valve plate or disc 134 will typically occur when the downward force applied to the shock absorber exceeds around 30 kN so as to allow damping fluid to be dumped more rapidly into the working chamber 31B in the direction of arrow 136. The pressure at which the valve plate 34 opens can be adjusted from 5 MPa to 9 Mpa at a constant 501/min$^{-1}$ flow rate or more by varying the number as well as the resilient properties of the plate springs and the pack of plate springs.

The valve plate 134 is provided with a central annular stepped recess or well 138. When the valve plate is in the closed position, the lower face 138A of the well and the upper face 140 of the valve plate serve to close off the passageways 108A by mating with the complementally stepped planar faces 142 and 144 of the valve body. As the valve plate begins to open as a result of a pressure build-up within the passages 108A, oil escapes through a composite opening 146 defined between adjacent faces 144 and 140 of the respective valve body and valve plate. The mating stepped arrangement between the piston and the valve plate contributes to the concentricity of the valve plate as it moves axially, which makes for more precise and consistent opening.

In prior art uniplanar valve plates, an immediate and marked pressure drop occurs as the valve plate opens against the counter-bias of the plate spring pack. This lends to cause the valve plate to be biased back to the closed or almost closed position, and then to cycle or hunt unstably between a closed and a partly open position. This is particularly prone to occur on initial opening of the valve plate, which tends to occur at a "cracking" force which is greater than the normal repetitive opening force. During the opening process, the annular well 138 acts as a pressure accumulator or sump to assist in the pressure build-up and to reduce a loss in pressure arising from the initial flow of fluid through the opening 146. It has experimentally been found that the provision of the well 138 effectively reduces and stabilizes the end load or counter-force exerted by the piston assembly. The opening characteristics of the valve plate 134 can be varied by adjusting the width and/or depth of the well 138.

Figure 13:
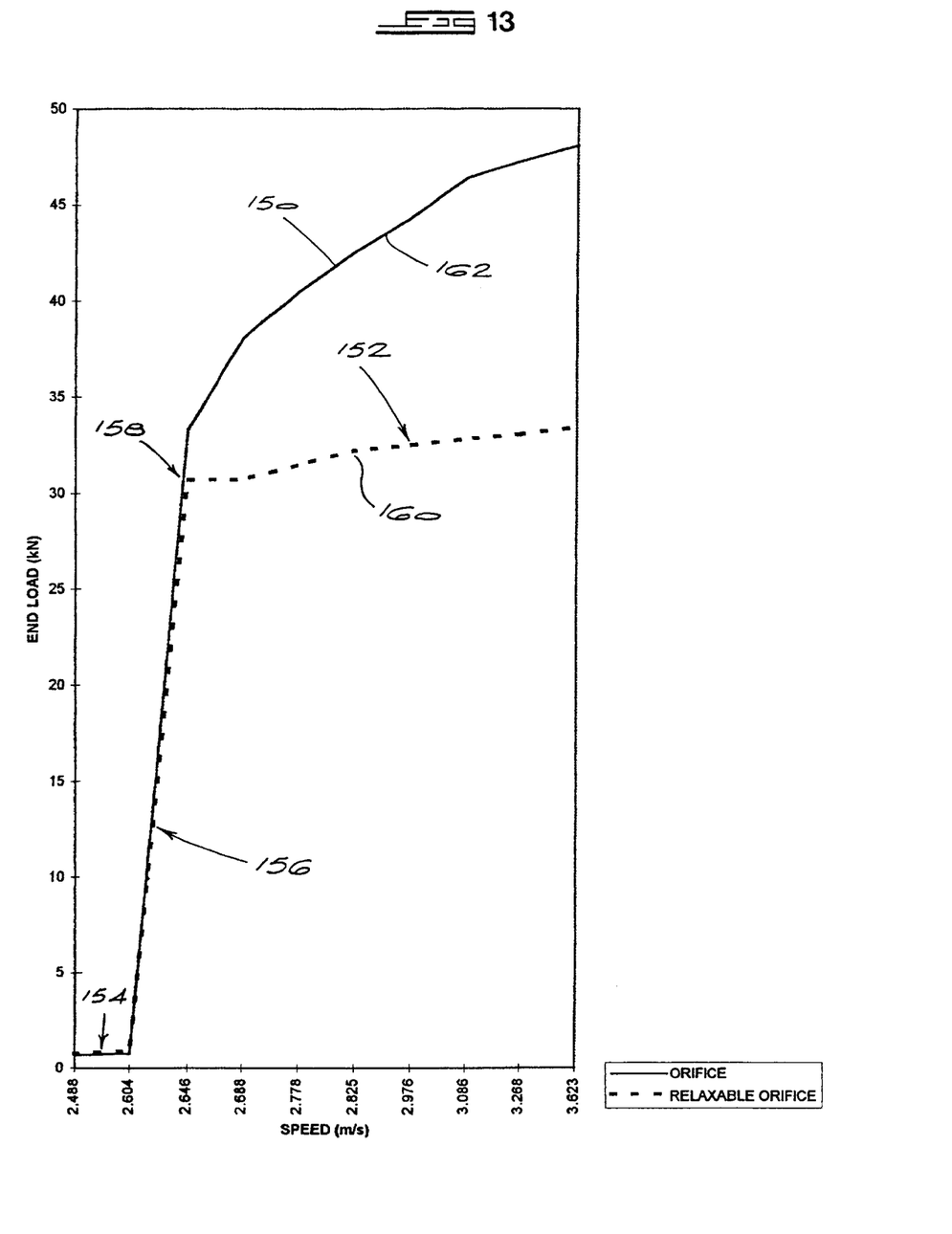
FIG. 13 shows two comparative end load-speed graphs illustrating the comparative performances of the rail retarder forming the third embodiment of the invention and a prior art fixed orifice rail retarder.

In FIG. 13, graphs 150 and 152 show end load plotted against speed for a fixed orifice "non-relaxable" piston assembly in the case of the solid outline graph and a piston assembly of the invention in the case of the broken outline graph. The graphs are essentially identical for the FIG. 1 idle modes up to 2.604 m/s, as is shown at 154. In the FIG. 10 mode of operation, which is shown at 156, both of the graphs climb steeply, with the valve plate 134 beginning to open at just over 30 kN at an elbow 158 of the broken outline graph, with the graph then assuming a slightly upwardly slanting profile, as is shown at 160, in which the end load increases very gradually up to around 32.5 kN at a speed of 3.623 ms$^{-1}$. In contrast, the solid outline graph 150 continues to climb steeply until an end load of just under 35 kN, and thereafter tapers off far less gradually, as is shown at 162. It is thus clearly apparent that, whilst the mixed orifice version is able to absorb more energy, represented by the area between the respective curves, the relaxable orifice version of the present invention is more consistently responsive to an increase in end load, thereby effectively reducing the counter-force exerted by the rail retarder at high wagon speeds. This has the effect of reducing bounce, in particular with regard to lighter wagons travelling at higher speeds. In addition, as hunting or cycling of the valve plate is reduced, there is less resultant wear on the plate spring pack arising from rapid flexing thereof.

Figure 12:
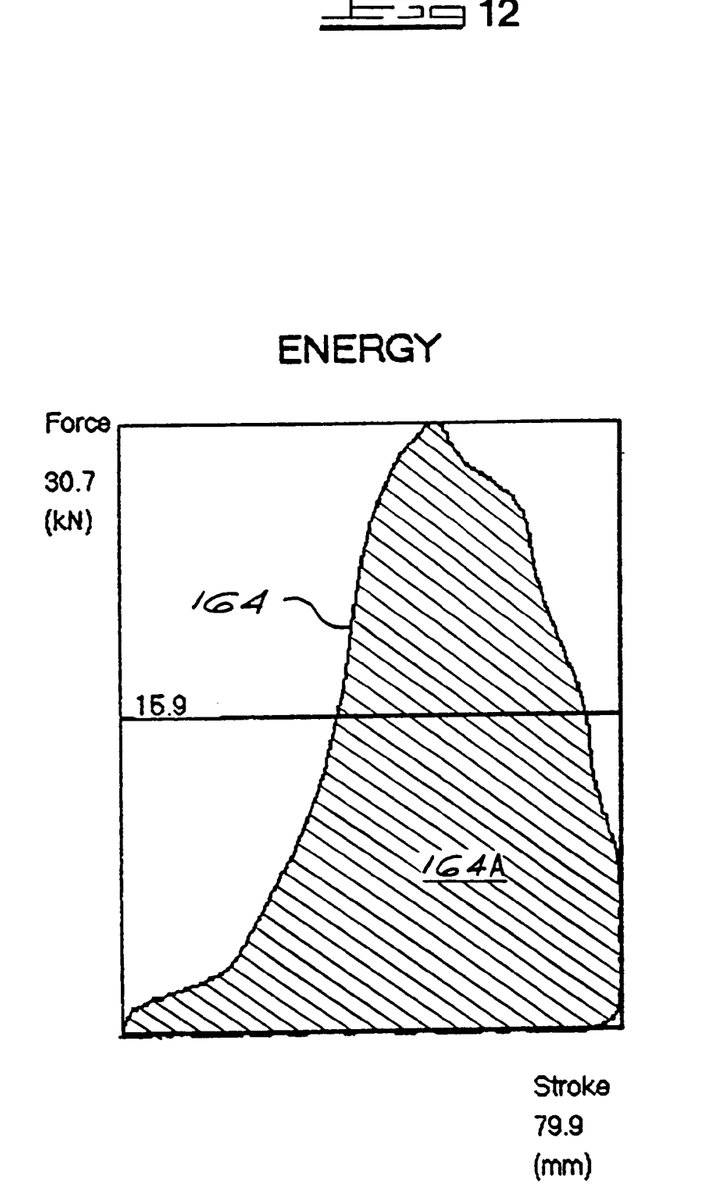
FIG. 12 shows a force-stroke graph illustrating the performance of the rail retarder fitted with the piston assembly of FIGS. 9 to 11.

In FIG. 12, a typical force-stroke graph 164 is shown for a wagon retarder incorporating the piston assembly of FIGS. 1 to 3. The nitrogen gas pressure was set to 700 kPa, at a temperature of 20° C. and an oil mass of 178 g. The incoming speed of the wagon was 2.688 ms$^{-1}$, and the outgoing speed was 2.604 ms$^{-1}$, with the load on each wheel being approximately 34 kN. The resultant energy extracted by the retarder, which is represented by the hatched area 164A, was found to be 1273 J. The average retarding force was 15.9 kN, with the maximum force being 30.7 kN. The duration of the power or retarding stroke was found to be 110 ms, and the duration of the return stroke was found to be 241 ms, with the cylinder reaching a maximum downward velocity of 1.448 m/s.

I claim:

1. A wagon retarder comprising:
    a) a cylinder defining a cavity between first and second end walls;
    b) a piston rod extending axially through one of the end walls;
    c) a piston assembly including a piston carried on the piston rod and mounted to slide axially within the cylinder so as to divide the cavity into first and second working chambers arranged to contain damping fluid;
    d) first passage means extending through the piston assembly and communicating between the first and second working chambers;
    e) first spring valve means for at least partly closing the first passage means in the event of the axial velocity of the piston relative to the cylinder in a first axial direction exceeding a predetermined value, and
    f) at least one permanently open restricted orifice being defined in the first valve means and communicating between the first and second working chambers via the first passage means on closure of the first valve means, the restricted orifice being restricted relative to the first passage means so as to limit the flow of damping fluid between the first and second working chambers and to set up a pressure differential therebetween to apply a predetermined damping force, with the dimensions of the restricted orifice being determined in accordance with the desired force-displacement profile of the wagon retarder, wherein the first spring valve means includes a first valve plate and first biasing means for biasing the valve plate into an open position whilst the axial velocity of the piston relative to the cylinder in the first axial direction is less than the predetermined value, with the restricted orifice extending through the valve plate and communicating directly with the first passage means when the valve plate is closed.

2. A wagon retarder according to claim 1 in which the valve plate is located operatively upstream of the first passage means within the first working chamber.

3. A wagon retarder according to claim 1 which includes second passage means communicating between the first and second working chambers, second valve means for at least partly obturating the second passage means, and second biasing means for biasing the second valve means into a closed position, the second valve means being arranged to open in response to a predetermined pressure differential existing between the first and second working chambers.

4. A wagon retarder according to claim 3 in which the second valve means includes a second valve plate defining a pressure accumulator well portion which is responsive to pressure exerted by fluid via the second passage means, the second valve plate being arranged to open in response to a predetermined pressure differential existing between the first and second working chambers.

5. A wagon retarder according to claim 1 in which the first passage means comprises a plurality of equi-spaced cylindrical first passages extending axially through the piston assembly, the at least one permanently open restricted orifice comprises a plurality of corresponding equi-spaced cylindrical restricted orifices extending axially through the first valve means, and alignment means are provided for aligning the first passages with the restricted orifices.

6. A wagon retarder according to claim 5 in which the restricted orifices have a diameter of 1 mm to 3 mm.

7. A shock absorber comprising:
   a) a cylinder defining a cavity between first and second end walls;
   b) a piston rod extending axially through one of the end walls;
   c) a piston assembly carried on the piston rod and mounted to slide axially within the cylinder so as to divide the cavity into first and second working chambers arranged to contain damping fluid;
   d) first passage means extending through the piston assembly and communicating between the first and second working chambers;
   e) second passage means extending through the piston assembly and communicating in use between the first and second working chambers;
   f) first valve means for at least partly closing the first passage means in the event of the axial velocity of the piston relative to the cylinder in a first axial direction exceeding a predetermined value; and
   g) second valve means for at least partly obturating the second passage means, the second valve means including a valve plate defining a pressure accumulator well which is responsive to pressure exerted by fluid via the second passage means, and biasing means for biasing the valve plate into a closed position, the second valve means being arranged to open in response to a predetermined pressure differential existing between the first and second working chambers.

8. A shock absorber according to claim 7 in which at least one restricted orifice is defined in the first valve means and communicates between the first and second working chambers via the first passage means on closure of the first valve means, the restricted orifice being restricted relative to the first passage means so as to limit the flow of damping fluid between the first and second working chambers and set up a pressure differential therebetween to apply a damping force.

9. A shock absorber according to claim 8 in which the second valve means is in the form of a true valve, in that it is capable of completely obturating the second passage means.

10. A shock absorber according to claim 7 in which the second valve means is in the form of an orifice plate which only partly obturates the second passage means so as to define a permanently open restricted exhaust orifice.

11. A shock absorber according to claim 7 in which the pressure accumulator well includes an annular stepped recess, and the piston assembly includes an operatively rearmost face having a complementally stepped projection which locates within the recess in a sliding fit.

* * * * *